(12) United States Patent
Ma (10) Patent No.: US 12,164,721 B2
(45) Date of Patent: Dec. 10, 2024

(54) DISPLAY PANEL AND MOBILE TERMINAL

(71) Applicant: Wuhan China Star Optoelectronics Semiconductor Display Technology Co., Ltd., Wuhan (CN)

(72) Inventor: Liang Ma, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/760,769

(22) PCT Filed: Feb. 24, 2022

(86) PCT No.: PCT/CN2022/077559
§ 371 (c)(1),
(2) Date: Mar. 16, 2022

(87) PCT Pub. No.: WO2023/155225
PCT Pub. Date: Aug. 24, 2023

(65) Prior Publication Data
US 2024/0045538 A1    Feb. 8, 2024

(30) Foreign Application Priority Data

Feb. 15, 2022   (CN) .......................... 202210137719.4

(51) Int. Cl.
*G06F 3/041* (2006.01)
*G06F 3/044* (2006.01)
(52) U.S. Cl.
CPC ........ *G06F 3/04164* (2019.05); *G06F 3/0412* (2013.01); *G06F 3/0443* (2019.05)

(58) Field of Classification Search
CPC ... G06F 3/0412; G06F 3/04164; G06F 3/0443
See application file for complete search history.

(56) References Cited

U.S. PATENT DOCUMENTS

| 2018/0173346 A1* | 6/2018 | Du | ........................ H01L 27/124 |
| 2019/0332202 A1* | 10/2019 | Huang | .................... G06F 3/044 |

(Continued)

FOREIGN PATENT DOCUMENTS

| CN | 107422903 A | 12/2017 |
| CN | 107656646 A | 2/2018 |

(Continued)

OTHER PUBLICATIONS

International Search Report in International application No. PCT/CN2022/077559, mailed on Nov. 1, 2022.

(Continued)

*Primary Examiner* — Michael Pervan
(74) *Attorney, Agent, or Firm* — Menachem Nathan; Nathan & Associates (57) ABSTRACT

A display panel and a mobile terminal are disclosed. The display panel includes a plurality of touch control electrodes spaced apart from each other and a plurality of touch control lead lines spaced apart from each other. The touch control electrodes include a plurality of touch control electrode columns. At least part of the touch control lead lines include a first line section and a second line section which extend along different directions. The first line section of the touch control lead lines overlaps the corresponding touch control electrodes, and the second line section at least overlaps the touch control electrodes, which are closest to the non-display area, of the corresponding touch control electrode columns.

20 Claims, 9 Drawing Sheets

(56) References Cited

U.S. PATENT DOCUMENTS

| | | | |
|---|---|---|---|
| 2021/0064162 A1* | 3/2021 | Yin | G06F 3/04164 |
| 2021/0208733 A1* | 7/2021 | Chen | G06F 3/0445 |
| 2023/0041797 A1* | 2/2023 | Ren | G06F 3/0443 |
| 2023/0097832 A1* | 3/2023 | Kuo | G06F 3/0412 |
| | | | 345/173 |

FOREIGN PATENT DOCUMENTS

| | | |
|---|---|---|
| CN | 110515496 A | 11/2019 |
| CN | 113296624 A | 8/2021 |
| CN | 113296632 A | 8/2021 |
| WO | 2021249098 A1 | 12/2021 |

OTHER PUBLICATIONS

Written Opinion of the International Search Authority in International application No. PCT/CN2022/077559, mailed on Nov. 1, 2022.
Chinese Office Action issued in corresponding Chinese Patent Application No. 202210137719.4 dated May 21, 2023, pp. 1-6.

\* cited by examiner

DISPLAY PANEL AND MOBILE TERMINAL

FIELD

The present disclosure relates to a field of display technologies, and more particularly, to a display panel and a mobile terminal.

BACKGROUND

In recent years, touch control performance has been a vital factor that affects quality of display panels. One of important touch control techniques is a self-capacitance touch control technique. In the self-capacitance touch control technique, how touch control lead lines, which are connected to touch control electrodes and are disposed on a same layer as the touch control electrodes, is fanned-out will affect a size of a lower border of display panels. For example, a size of touch control electrodes disposed in the lowest column is reduced, thereby providing space for touch control lead lines to be fanned-out. However, this method limits a number of touch control lead lines disposed in a display area, and part of touch control lead lines still need to pass through the lower border, which is not beneficial for achieving a narrow border.

Therefore, it is necessary to provide a display panel to solve the above technical issue.

SUMMARY

Regarding the Technical Issue

The present disclosure provides a display panel and a mobile terminal, which can alleviate a following technical issue: in conventional display panels, a fan-out method of touch control lead lines is not beneficial for achieving a narrow border.

To solve the above technical issue, technical solutions provided by the present disclosure are described as follows:
  an embodiment of the present disclosure provides a
    display panel, comprising a display area and a non-display area disposed on at least one side of the display area, wherein the display panel comprises:
  a substrate;
  a touch control layer disposed on a side of the substrate in the display area, wherein the touch control layer comprises a plurality of touch control electrodes spaced apart from each other; and
  a lead line layer disposed between the substrate and the touch control layer, wherein the lead line layer comprises a plurality of touch control lead lines overlapping the touch control electrodes and spaced apart from each other, and each of the touch control electrodes is electrically connected to the corresponding touch control lead lines;
  wherein the touch control electrodes comprise a plurality of touch control electrode columns, at least part of the touch control lead lines comprise a first line section extending along a first direction and a second line section extending along a second direction, and the first direction and the second direction are different; and in at least part of the touch control lead lines, the first line section of the touch control lead lines overlaps the touch control electrodes of the corresponding touch control electrode columns, and the second line section at least overlaps the touch control electrodes, which are closest to the non-display area, of the corresponding touch control electrode columns.

Preferably, the display panel comprises a virtual central axis extending along the first direction; and the second line section of the touch control lead lines disposed at two sides of the virtual central axis extends toward the virtual central axis.

Preferably, in at least part of the touch control lead lines, the first line section of the touch control lead line overlaps the touch control electrodes of the touch control electrode corresponding to the first line section, and the second line section at least overlaps the touch control electrodes, which are closest to the non-display area, of at least two adjacent touch control electrode columns.

Preferably, the touch control lead lines comprise a touch control lead line group corresponding to the touch control electrode columns, and the touch control lead lines of the touch control lead line group are electrically connected to the touch control electrodes of the corresponding touch control electrode columns; and in the touch control lead line group, at least part of the touch control lead lines comprise the first line section and the second line section corresponding to each other, and the touch control lead lines having the second line section are disposed on a side of the touch control lead lines not having the second line section away from the virtual central axis.

Preferably, in the touch control lead line group, each of the touch control lead lines comprises the first line section and the second line section corresponding to each other.

Preferably, the first line section of the touch control lead lines overlaps all of the touch control electrodes of the corresponding touch control electrode column, and the second line section at least overlaps the touch control electrodes, which are closest to the non-display area, of the corresponding touch control electrode columns.

Preferably, the touch control lead lines having the second line section comprises a third line section connected to an end of the second line section away from the first line section, the third line section is parallel to the first line section, and the third line section extends from the display area to the non-display area.

Preferably, in a top view of the display panel, between two adjacent touch control lead lines having the second line section, a distance between two adjacent second line sections is less than or equal to a distance between two adjacent first line sections, and a distance between two adjacent third line sections is less than or equal to the distance between two adjacent first line sections.

Preferably, the touch control layer comprises a line-changing section connected to an end of the third line section away from the second line section, and the line-changing section is disposed in the non-display area; the display panel comprises a driving circuit layer disposed on a side of the lead line layer away from the touch control layer and a first insulating layer disposed between the driving circuit layer and the lead line layer, and the first insulating layer comprises a plurality of first through-holes; and the line-changing section is electrically connected to the driving circuit layer by the first through-holes.

Preferably, in part of the touch control lead lines, the second line section directly extends from the display area to the non-display area.

An embodiment of the present disclosure further provides a mobile terminal, comprising a display panel and a main terminal body, wherein the main terminal body is integrated with the display panel;
  wherein the display panel comprises a display area and a non-display area disposed on at least one side of the display area;

wherein the display panel comprises:
a substrate;
a touch control layer disposed on a side of the substrate in the display area, wherein the touch control layer comprises a plurality of touch control electrodes spaced apart from each other; and
a lead line layer disposed between the substrate and the touch control layer, wherein the lead line layer comprises a plurality of touch control lead lines overlapping the touch control electrodes and spaced apart from each other, and each of the touch control electrodes is electrically connected to the corresponding touch control lead lines;
wherein the touch control electrodes comprise a plurality of touch control electrode columns, at least part of the touch control lead lines comprise a first line section extending along a first direction and a second line section extending along a second direction, and the first direction and the second direction are different; and in at least part of the touch control lead lines, the first line section of the touch control lead lines overlaps the touch control electrodes of the corresponding touch control electrode columns, and the second line section at least overlaps the touch control electrodes, which are closest to the non-display area, of the corresponding touch control electrode columns.

Preferably, the display panel comprises a virtual central axis extending along the first direction; and the second line section of the touch control lead lines disposed at two sides of the virtual central axis extends toward the virtual central axis.

Preferably, in at least part of the touch control lead lines, the first line section of the touch control lead line overlaps the touch control electrodes of the touch control electrode corresponding to the first line section, and the second line section at least overlaps the touch control electrodes, which are closest to the non-display area, of at least two adjacent touch control electrode columns.

Preferably, the touch control lead lines comprise a touch control lead line group corresponding to the touch control electrode columns, and the touch control lead lines of the touch control lead line group are electrically connected to the touch control electrodes of the corresponding touch control electrode columns; and in the touch control lead line group, at least part of the touch control lead lines comprise the first line section and the second line section corresponding to each other, and the touch control lead lines having the second line section are disposed on a side of the touch control lead lines not having the second line section away from the virtual central axis.

Preferably, in the touch control lead line group, each of the touch control lead lines comprises the first line section and the second line section corresponding to each other.

Preferably, the first line section of the touch control lead lines overlaps all of the touch control electrodes of the corresponding touch control electrode column, and the second line section at least overlaps the touch control electrodes, which are closest to the non-display area, of the corresponding touch control electrode columns.

Preferably, the touch control lead lines having the second line section comprises a third line section connected to an end of the second line section away from the first line section, the third line section is parallel to the first line section, and the third line section extends from the display area to the non-display area.

Preferably, in a top view of the display panel, between two adjacent touch control lead lines having the second line section, a distance between two adjacent second line sections is less than or equal to a distance between two adjacent first line sections, and a distance between two adjacent third line sections is less than or equal to the distance between two adjacent first line sections.

Preferably, the touch control layer comprises a line-changing section connected to an end of the third line section away from the second line section, and the line-changing section is disposed in the non-display area; the display panel comprises a driving circuit layer disposed on a side of the lead line layer away from the touch control layer and a first insulating layer disposed between the driving circuit layer and the lead line layer, and the first insulating layer comprises a plurality of first through-holes; and the line-changing section is electrically connected to the driving circuit layer by the first through-holes.

Preferably, in part of the touch control lead lines, the second line section directly extends from the display area to the non-display area.

Regarding the beneficial effects:
in the present disclosure, a plurality of touch control lead lines and a plurality of touch control electrodes are disposed on different layers. In at least part of the touch control lead lines, a first line section of the touch control lead lines overlaps the touch control electrodes of corresponding touch control electrode columns, and a second line section at least overlaps the touch control electrodes, which are closest to the non-display area, of the corresponding touch control electrode columns. Therefore, space required for fan-out and layout of the touch control lead lines is enlarged, and the touch control lead lines can converge in a display area, which is beneficial for fan-out. As such, touch control performance can be ensured, and a width of a lower border can be reduced, so a display effect is improved.

DETAILED DESCRIPTION

The present disclosure provides a display panel and a mobile terminal. Embodiments are further described below in detail with reference to accompanying drawings to make objectives, technical solutions, and effects of the present disclosure clearer and more precise. It should be noted that described embodiments are merely used to construct the present disclosure and are not intended to limit the present disclosure.

The display panel and the mobile terminal are described below, respectively. It should be noted that the description order of embodiments does not mean preferred orders of the embodiments.

Please refer to FIGS. 1 to 10. An embodiment of the present disclosure provides a display panel 100, including a display area A and a non-display area B disposed on a side of the display area A. The display panel 100 includes:

a substrate 410;

a touch control layer disposed on a side of the substrate 410 in the display area A, wherein the touch control layer includes a plurality of touch control electrodes 200 spaced apart from each other;

a lead line layer disposed between the substrate 410 and the touch control layer, wherein the lead line layer includes a plurality of touch control lead lines 300, the touch control lead lines 300 overlaps the touch control electrodes 200 and are spaced apart from each other, and each of the touch control electrodes 200 is electrically connected to the corresponding touch control lead lines 300;

wherein each of the touch control electrodes 200 includes a plurality of touch control electrode columns 201 spaced apart from each other and extending along a first direction. At least part of the touch control lead lines 300 include a first line section 310 extending along the first direction and a second line section 320 extending along a second direction. The first direction and the second direction are different. In at least part of the touch control lead lines 300, the first line section 310 of the touch control lead lines 300 overlaps the touch control electrodes 200 of the corresponding touch control electrode columns 201. The second line section 320 at least overlaps the touch control electrodes 200, which are closest to the non-display area B, of the corresponding touch control electrode columns 201.

In the present disclosure, a plurality of touch control lead lines and a plurality of touch control electrodes are disposed on different layers. In at least part of the touch control lead lines, a first line section of the touch control lead lines overlaps the touch control electrodes of corresponding touch control electrode columns, and a second line section at least overlaps the touch control electrodes, which are closest to the non-display area, of the corresponding touch control electrode columns. Therefore, space required for fan-out and layout of the touch control lead lines is enlarged, and the touch control lead lines can converge in a display area, which is beneficial for fan-out. As such, touch control performance can be ensured, and a width of a lower border can be reduced, so a display effect is improved.

Technical solutions provided by the present disclosure are described below in conjunction with specification embodiments.

Figure 1:
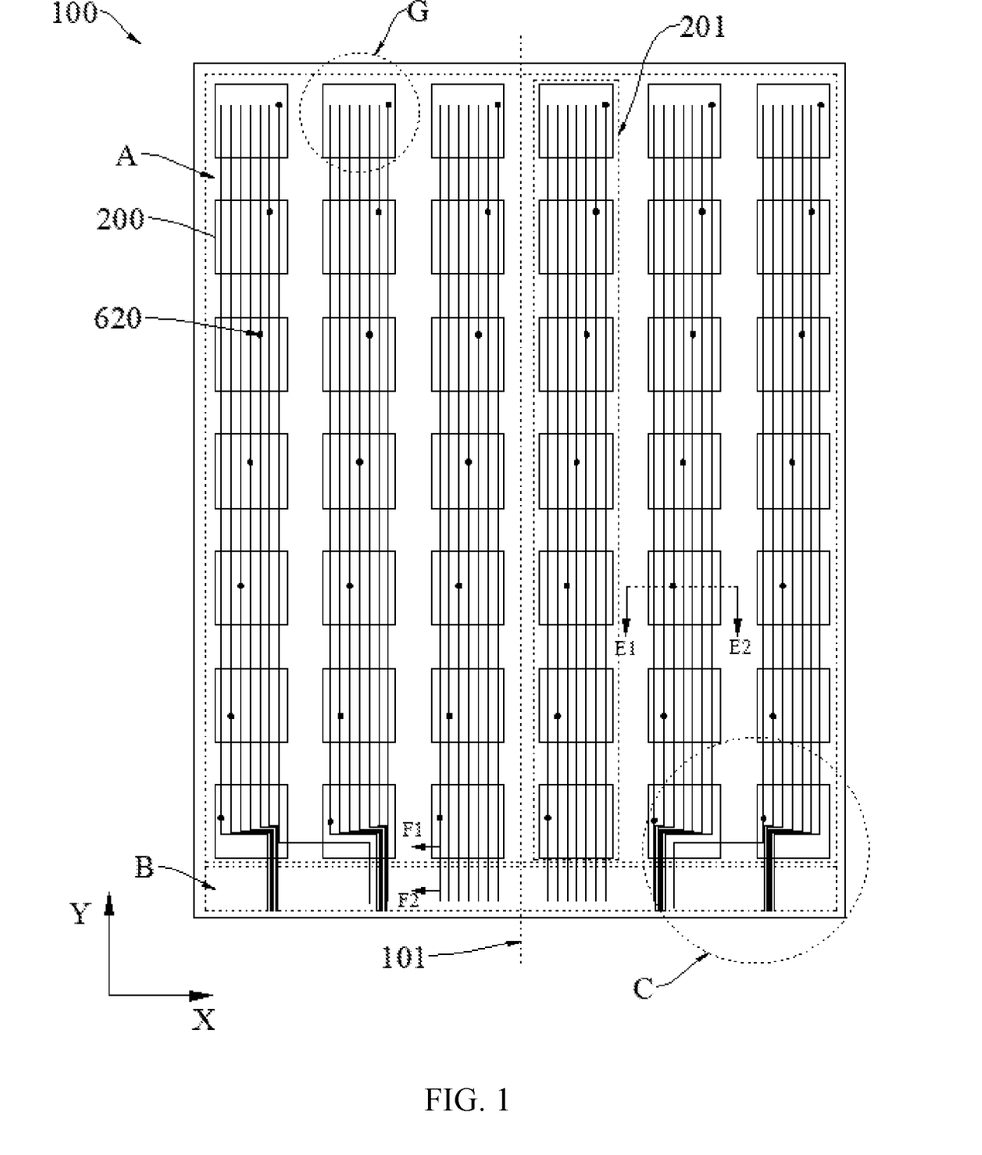
FIG. 1 is a top view showing a first structure of a display panel provided by an embodiment of the present disclosure.

In the present embodiment, as shown in FIG. 1, a display panel 100 includes a display area A and a non-display area B disposed on a side of the display area A. The display panel 100 includes a touch control layer and a lead line layer disposed on a side of the touch control layer.

Figure 2:
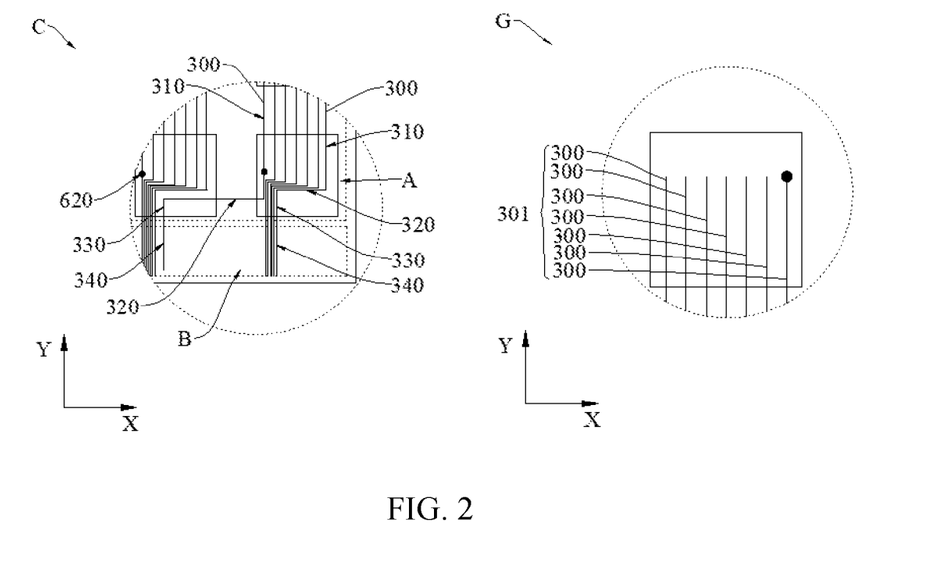
FIG. 2 is an enlarged view of an area C and an area G in FIG. 1.
Figure 9:
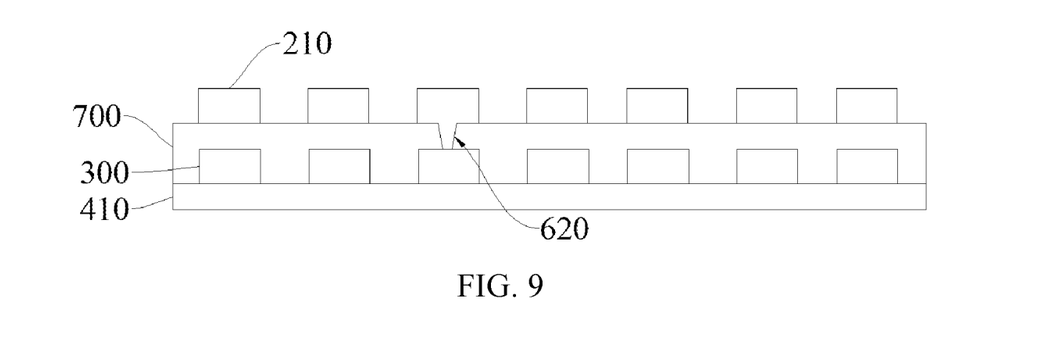
FIG. 9 is a structural schematic view showing a cross-section of FIG. 1 taken alone E1E2.

In some embodiments, please refer to FIG. 1, FIG. 2, and FIG. 9, the touch control layer is disposed on a side of the substrate 410 in the display area A. The touch control layer includes a plurality of touch control electrodes 200 spaced apart from each other. The lead line layer is disposed between the substrate 410 and the touch control layer and includes a plurality of touch control lead lines 300 overlapping the touch control electrodes 200 and spaced apart from each other. Each of the touch control electrodes 200 is electrically connected to the corresponding touch control electrode lead lines 300. Touch control electrodes 200 include a plurality of touch control electrode columns 201 spaced apart from each other and extending along a first direction. At least part of the touch control lead lines 300 include a first line section 310 extending along a first direction and a second line section 320 extending along a second direction. The first direction and the second direction are different. In at least part of the touch control lead lines 300, the first line section 310 of the touch control lead lines 300 overlaps the touch control electrodes 200 of the corresponding touch control electrode columns 201. The second line section 320 at least overlaps the touch control electrodes 200, which are closest to the non-display area B, of the corresponding touch control electrode columns 201.

As shown in FIG. 1 and FIG. 2, the touch control electrodes 200 can be arranged in an array manner. The first direction is parallel to a y-axis. The touch control electrodes 200 form multiple rows and columns, wherein the rows are parallel to an x-axis and the columns are parallel to the y-axis. The touch control lead lines 300 and the touch control electrodes 200 are disposed on different layers. The touch control electrode columns 201 extend along the first direction and are horizontally arranged along the x-axis. Part of the touch control lead lines 300 are provided with the second line section 320 disposed adjacent to the non-display area B and converging toward the non-display area B. In at least part of the touch control lead lines 300, the first line section 310 of the touch control lead lines 300 overlaps the touch control electrodes 200 of the corresponding touch control electrode columns 201, and the second line section 320 at least overlaps the touch control electrodes 200, which are closest to the non-display area B, of the corresponding touch control electrode columns 201. Therefore, the touch control lead lines 300 can converge in the display area A, which is beneficial for fan-out. Touch control performance can be ensured, and a width of a lower border can be reduced, which improves a display effect.

Figure 3:
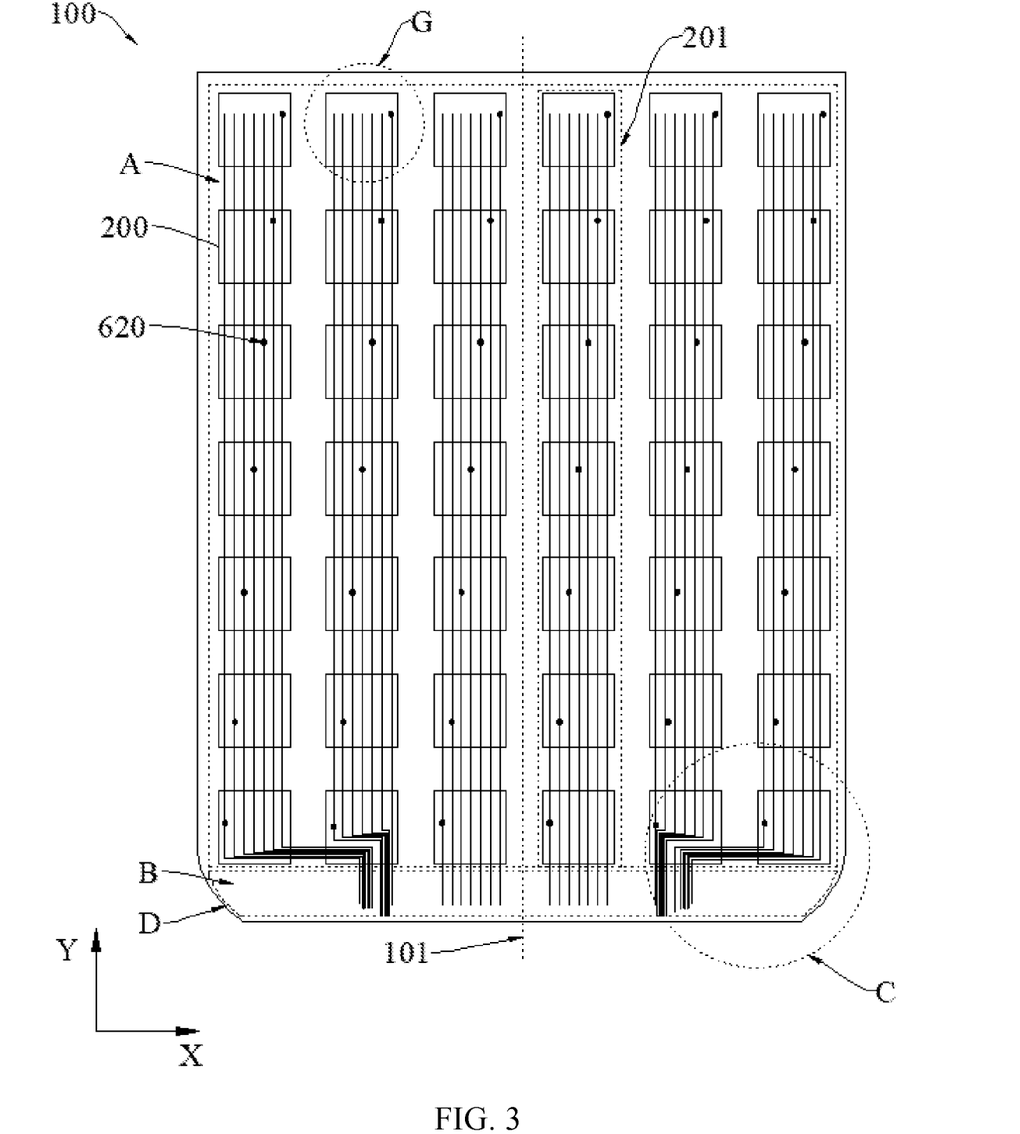
FIG. 3 is a top view showing a second structure of a display panel by an embodiment of the present disclosure.

In some embodiments, please refer to FIG. 1 and FIG. 3, the display panel 100 includes a virtual central axis 101 extending along the first direction. The second line section 320 of the touch control lead lines 300 disposed on two sides of the virtual central axis 101 extends toward the virtual central axis 101.

The virtual central axis 101 passes through a geometric center of the display panel 100. The virtual central axis 101 is perpendicular to a lower border of the display panel 100. The virtual central axis 101 is parallel to the y-axis. Therefore, the touch control lead lines 300 can converge toward the lower border in the display area A, which is beneficial for fan-out. Touch control performance can be ensured, and a width of a lower border can be reduced, which improves a display effect.

In some embodiments, please refer to FIG. 1 and FIG. 3, in at least part of the touch control lead lines 300, the first line section 310 of the touch control lead lines 300 overlaps the touch control electrodes 200 of the corresponding touch control electrode columns 302, and the second line section 320 overlaps the touch control electrodes 200, which are closest to the non-display area B, of at least two adjacent touch control electrode columns 201.

The second line section 320 crosses at least two touch control electrode columns 201. The leftmost column of the touch control electrode columns 201 is a first touch control electrode column, and a second touch control electrode column, a third touch control electrode column, . . . , and an nth touch control electrode column are sequentially disposed in the right. Take the first touch control electrode column as an example, the first touch control electrode column corresponds to multiple touch control lead lines 300. Part of the touch control lead lines 300 include the second line section 320. The second line section 320 of part of the touch control lead lines 300 extends along the x-axis to at least the second touch control electrode column. These touch control lead lines 300 provide a large space for fan-out and layout for other touch control lead lines 300. Therefore, the touch control lead lines 300 can converge in the display area A, which is beneficial for fan-out. Touch control performance can be ensured, and a width of a lower border can be reduced, which improves a display effect.

Figure 4:
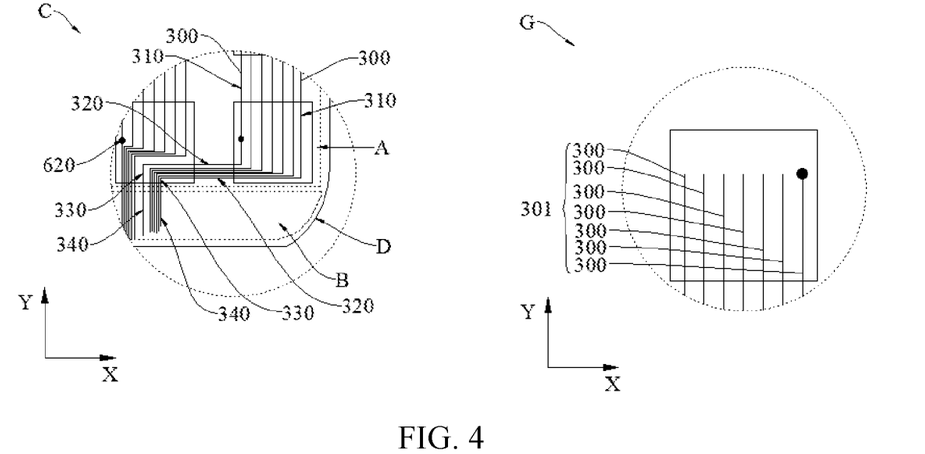
FIG. 4 is an enlarged view of an area C and an area G in FIG. 3.

In some embodiments, please refer to FIG. 3 and FIG. 4, the touch control lead lines 300 include a touch control lead line group 301 corresponding to the touch control electrode columns 201. In the touch control lead line group 301, all of the touch control lead lines 300 are electrically connected to the touch control electrodes 200 of the corresponding touch control electrode columns 201. In the touch control lead line group 301, at least part of the touch control lead lines 300 include the first line section 310 and the second line section 320 corresponding to each other, and all of the touch control lead lines 300 having the second line section 320 are disposed on a side of the touch control lead lines 300 not having the second line section 320 away from the virtual central axis 101.

In an area adjacent to a center of the display panel 100, the touch control lead lines 300 extend from the corresponding touch control electrodes 200 to the non-display area B. The touch control lead lines 300 adjacent to the center of the display panel 100 do not need to converge, especially the touch control lead lines 300 disposed at two sides of the virtual central axis 101 which a fan-out process can be directly performed on, which is beneficial for fan-out. As such, touch control performance can be ensured, and a width of a lower border can be reduced, which improves a display effect.

Figure 5:
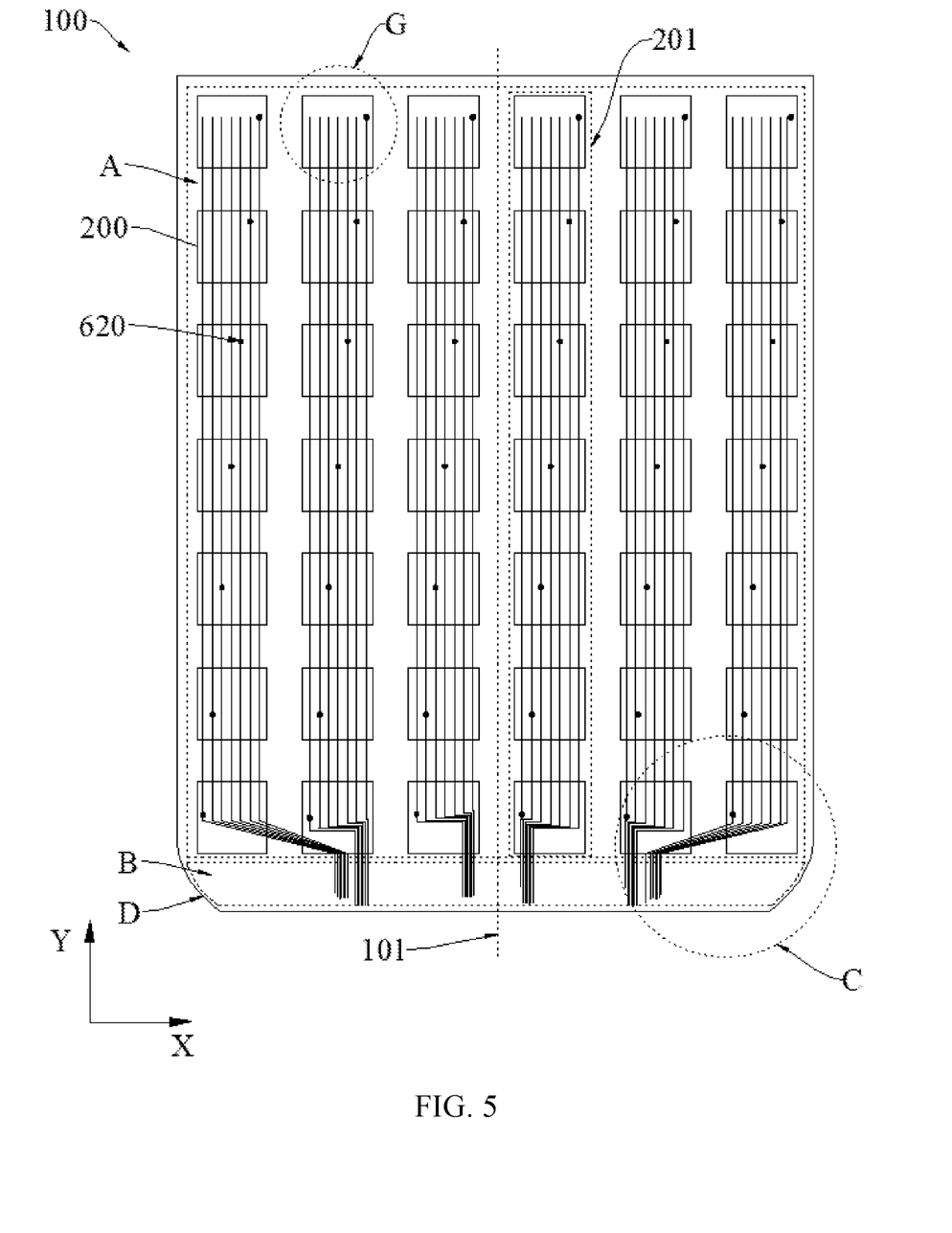
FIG. 5 is a top view showing a third structure of a display panel by an embodiment of the present disclosure.
Figure 6:
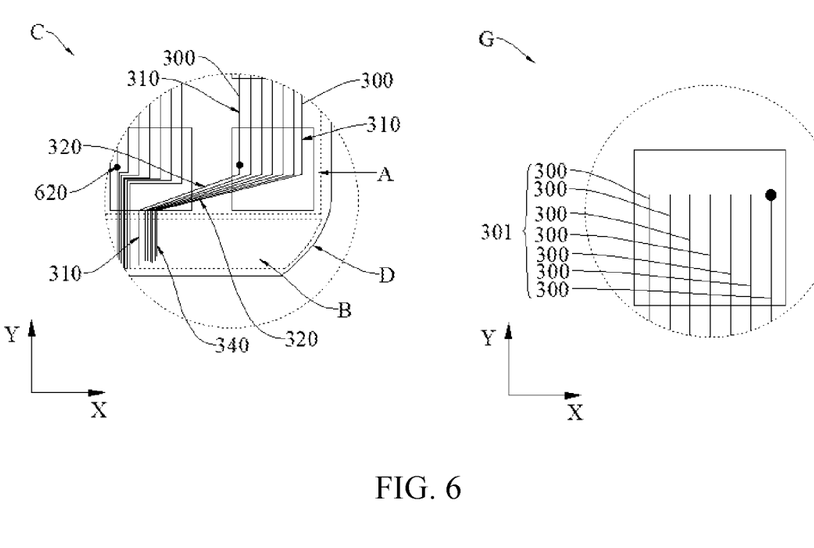
FIG. 6 is an enlarged view of an area C and an area G in FIG. 5.

In some embodiments, please refer to FIG. 5 and FIG. 6, each of the touch control lead lines 300 of the touch control lead line group 301 includes the first line section 310 and the second line section 320 corresponding to each other.

The touch control lead lines 300 tend to converge toward the virtual central line 101, thereby providing as large space for fan-out and layout as possible. As such, the touch control lead lines 300 can converge in the display area A, which is beneficial for fan-out. Touch control performance can be ensured and a width of a lower border can be reduced, which improves a display effect.

In some embodiments, please refer to FIG. 3 and FIG. 4, the first line section 310 of the touch control lead lines 300 overlaps all of the touch control electrodes 200 of the corresponding touch control electrode columns 201, and the second line section 320 at least overlaps the touch control electrodes 200, which are closest to the non-display area B, of the corresponding touch control electrode columns 201.

The touch control lead lines 300 are fanned-out from the touch control electrode 200 in the lowest row, thereby reducing an effect on a display center due to the touch control lead lines 300.

In some embodiments, please refer to FIGS. 1 to 4, in the touch control lead line group 301, the second line section 320 of the touch control lead lines 300 of a first part overlaps the touch control electrodes 200, which are closest to the non-display area B, of the corresponding touch control electrode columns 201. The second line section 320 of the touch control lead lines 300 of a second part overlaps the touch control electrodes 200, which are closest to the non-display area B, of the corresponding touch control electrodes 200. In addition, the touch control lead lines 300 of the second part are disposed on a side of the touch control lead lines 300 of the first part away from the virtual central axis 101.

Providing as much space corresponding to the touch control electrodes 200 closest to the non-display area B as possible can make more lines away from the virtual central line 101 converging toward the virtual central line 101.

In some embodiments, please refer to FIG. 3 and FIG. 4, four corners of the display panel 100 are rounded. Therefore, four corners of the display area A are rounded as well, leading to a small arrangement space for the touch control lead lines 300 corresponding to the touch control electrodes 200 in two columns respectively adjacent to a left edge and a right edge.

The second line section 320 of any one of the touch control lead lines 300 corresponding to the touch control electrodes 200 in at least one column away from the center of the display panel 100 at least crosses two touch control electrodes 200.

By making any one of the touch control lead lines 300 away from the center of the display panel 100 cross multiple columns and extend toward the touch control electrodes 200 adjacent to the center of the display panel 100, space for a rounded corner D of the display area A can be maximally saved, which is beneficial for designing the rounded corner D. A larger space for fan-out and layout is provided. As such, the touch control lead lines 300 can converge in the display area A, which is beneficial for fan-out. Touch control performance can be ensured, and a width of a lower border can be reduced, which improves a display effect.

In some embodiments, as shown in FIG. 3 and FIG. 4, the touch control lead lines 300 having the second line section 320 further include a third line section 330 connected to an end of the second line section 320 away from the first line section 310. The third line section 330 is parallel to the first line section 310. The third line section 330 extends from the display area A to the non-display area B.

The touch control lead lines 300 having the second line section 320 may further include the third line section 330. The third line section 330 is fanned-out to the non-display area B, and the non-display area B is connected to the driving circuit layer 400 by another line to complete sequential bending and bonding processes, which can further narrow the lower border of the display panel 100.

In some embodiments, please refer to FIG. 9, the display panel 100 further includes a second insulating layer 700 disposed between the touch control layer and the lead line layer. The second insulating layer 700 includes a plurality of second through-holes 620. The second through-holes 620 expose the touch control lead lines 300. The touch control lead lines 300 are electrically connected to the touch control electrodes 200 by the second through-holes 620.

In some embodiments, please refer to FIG. 3, in the touch control lead lines 300 having the first line section 310 and the second line section 320, and the first line section 310 is electrically connected to the touch control electrodes 200 by the second through-holes 620.

In some embodiments, please refer to FIG. 9, the touch control electrodes 200 include a plurality of touch control lines 210, and the touch control lines 210 are electrically connected to the touch control lead lines 300 by the second through-holes 620.

In some embodiments, the touch control electrodes 200 further include a plurality of connecting lines disposed on a same layer as the touch control lines 210. An extending direction of the connecting lines is perpendicular to an extending direction of the touch control lines 210. The extending direction of the touch control lines 210 is parallel to the y-axis, and the extending direction of the connecting lines is parallel to the x-axis.

In some embodiments, please refer to FIG. 9, in a top view of the display panel 100, at least part of the touch control lines 210 overlap the touch control lead lines 300.

Touch control performance of the touch control lines 210 can be ensured. Overlapping can improve a display effect and reduce visible strips, which further improves a display effect.

In some embodiments, in a top view of the display panel 100, the first line section 310 overlaps the touch control lines 210, and/or the third line section 330 overlaps the touch control lines 210.

In some embodiments, in a top view of the display panel 100, the second line section 320 overlaps the connecting lines, which can improve a display effect and reduce visible strips, thereby further improving a display effect.

In some embodiments, the touch control lines 210 may be singly disposed, or may be parallelly disposed. The touch control lead lines 310 may be singly disposed, or may be parallelly disposed.

In some embodiments, please refer to FIG. 5 and FIG. 6, as to the touch control electrodes 200 adjacent to the non-display area B, in a top view of the display panel 100, the second through-holes 620 are defined on a side of the touch control electrodes 200 away from the non-display area B.

When the second line section 320 crosses the touch control electrodes 200 and converge toward the center of the display panel 100, a distance between the second line section 320 and the non-display area B is relatively far, which can maximally provide space for the rounded corner D of the display area A. This is beneficial for designing the rounded corner D and can provide a larger space for fan-out and layout. Therefore, the touch control lead lines 300 can converge in the display area A, which is beneficial for fan-out. Touch control performance can be ensured and a width of a lower border can be reduced, which improves a display effect.

In some embodiments, please refer to FIG. 3 and FIG. 4, in a top view of the display panel 100, between two adjacent touch control lead lines 300 having the second line section 320, a distance between two adjacent second line sections 320 is less than or equal to a distance between two adjacent first line sections 310, and a distance between two adjacent third line sections 330 is less than or equal to a distance between two adjacent first line sections 310.

It is necessary to consider an effect on a display effect of the display area A due to the distance between two adjacent first line sections 310. The second line sections 320 and the third line sections 330 adjacent to the non-display area B can be arranged denser compared with the first line sections 310, thereby saving space to make the touch control lead lines 300 converge densely. Therefore, space for the rounded corner D of the display panel 100 can be saved, thereby providing larger space for fan-out and layout. As such, the touch control lead lines 300 can converge in the display area A, which is beneficial for fan-out. Touch control performance can be ensured and a width of a lower border is reduced, which improves a display effect.

In some embodiments, please refer to FIG. 3 and FIG. 4, the touch control lead lines 300 adjacent to the center of the display panel 100 straightly extend from the touch control electrodes 200 to the non-display area B.

The touch control lead lines 300 adjacent to the center of the display panel 100 do not need to converge, especially the touch control lead lines 300 disposed at two sides of the virtual central axis 101. The virtual central axis 101 passes through the geometric center of the display panel 100. The virtual central axis 101 is perpendicular to the lower border of the display panel 100. The virtual central axis 101 is parallel to the y-axis. Therefore, the touch control lead lines 300 can be directly fanned-out, which is beneficial for fan-out. Touch control performance can be ensured and a width of a lower border can be reduced, which improves a display effect.

Figure 10:
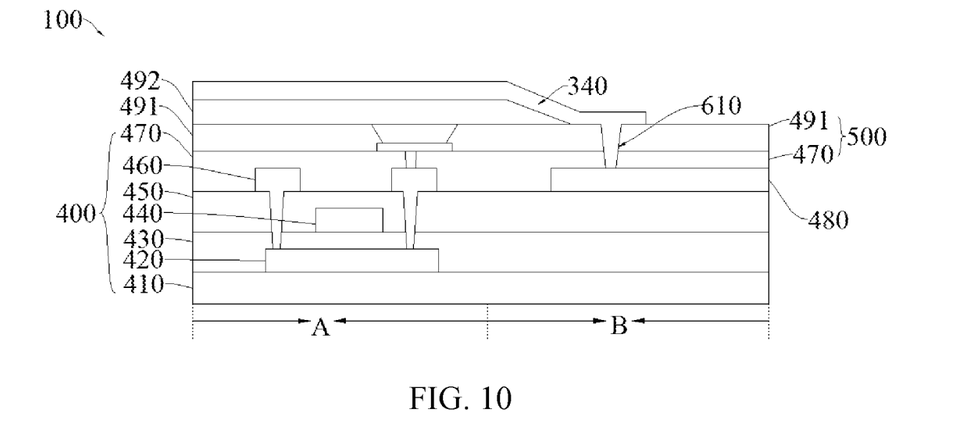
FIG. 10 is a structural schematic view showing a cross-section of FIG. 1 taken along F1F2.

In some embodiments, please refer to FIG. 10, the touch control layer further includes a line-changing section 340 connected to an end of the third line section 330 away from the second line section 320. The line-changing section 340 is disposed in the non-display area B. The display panel 100 further includes a driving circuit layer 400 disposed on a side of the lead line layer away from the touch control layer, a first insulating layer disposed between the driving circuit layer 400 and the lead line layer, a plurality of first through-holes 610 disposed on the first insulating layer 500. The line-changing section 340 is electrically connected to the driving circuit layer 400 by the first through-holes 610.

The touch control lead lines 300 is connected to the driving circuit layer 400 by other lines, and is fanned-out and is bonded to a driving control unit together with the driving circuit layer 400, thereby saving a number and cost of the driving control unit.

In some embodiments, please refer to FIG. 9 and FIG. 10, the driving circuit layer 400 includes a substrate, an active layer 420 disposed on the substrate 410, an interlayer insulating layer 430 disposed on the active layer 420, a gate layer 440 disposed on the interlayer insulating layer 430, a gate insulating layer 450 disposed on the gate layer 440, a source/drain electrode layer 460 disposed on the gate insulating layer 450, and a third insulating layer 470 disposed on the source/drain electrode layer 430.

In some embodiments, please refer to FIG. 10, the display panel 100 further includes a luminescent functional layer and an encapsulation layer 492 disposed between the driving circuit layer 400 and the lead line layer. The encapsulation layer 492 is disposed between the luminescent functional layer and the lead line layer.

In some embodiments, please refer to FIG. 10, the luminescent functional layer includes an anode layer, a pixel-defining layer 491, a luminescent material layer, and a cathode layer which are disposed above the third insulating layer 470.

In some embodiments, please refer to FIG. 10, the driving circuit layer 400 further includes a plurality of line-changing lead lines 480 disposed in the non-display area B and disposed on a same layer as the source/drain electrode layer 160. The first insulating layer 500 includes the third insulating layer 470 and the encapsulation layer 492. The first through-holes 610 passes through the third insulating layer 470 and the pixel-defining layer 491, thereby exposing the line-changing lead lines 480.

In some embodiments, please refer to FIG. 10, the line-changing section 340 is electrically connected to the line-changing lead lines 480 by the first through-holes 610.

Figure 7:
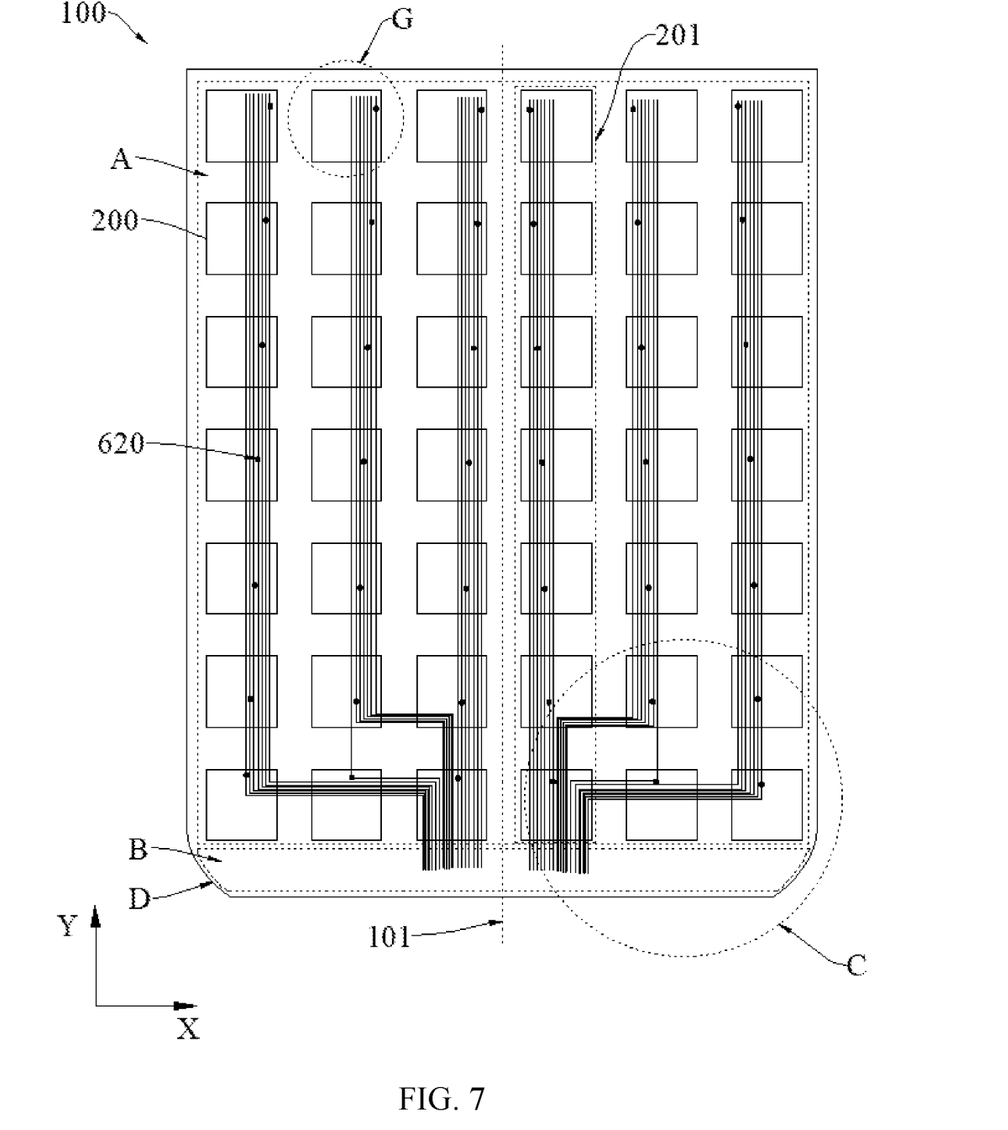
FIG. 7 is a top view showing a fourth structure of a display panel by an embodiment of the present disclosure.
Figure 8:
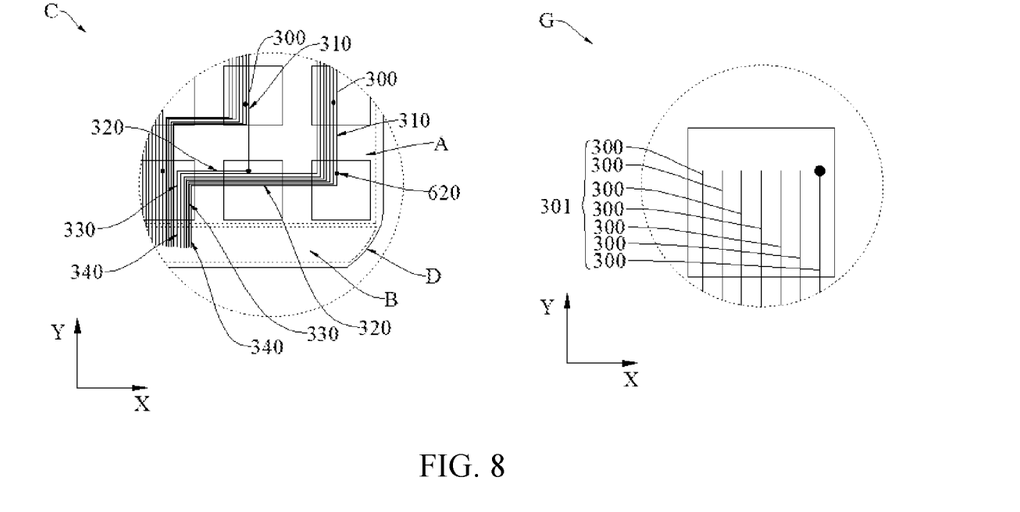
FIG. 8 is an enlarged view of an area C and an area G in FIG. 7.

In some embodiments, please refer to FIG. 7 and FIG. 8, as to the touch control lead lines 300 corresponding to at least one column of the touch control electrodes 200 away from the center of the display panel 100, a distance between an edge of the touch control electrodes 200 adjacent to the center of the display panel 100 and the touch control lead lines 300 adjacent to the center of the display panel 100 is less than a distance between an edge of the touch control electrodes 200 away from the center of the display panel 100 and the touch control electrodes 300 away from the center of the display panel 100.

By disposing the touch control lead lines 300 corresponding to at least one column of the touch control electrodes 200 away from the center of the display panel 100 extend toward the center of the display panel 100, especially the touch control lead lines 300 disposed adjacent to the leftmost border and the rightmost border of the display panel 100, space required for the rounded corner D of the display panel 100 can be reduced. Therefore, larger space for fan-out and layout can be provided. As such, the touch control lead lines 300 can converge in the display area A, which is beneficial for fan-out. Touch control performance can be ensured and a width of a lower border can be reduced, which improves a display effect.

In some embodiments, a position of the second through-holes may be appropriately adjusted according to an extending path of the touch control lead lines 300. Please review FIG. 7 and FIG. 8, in a top view, the second through-holes are symmetrical to each other with respect to the virtual central axis 101.

In some embodiments, please refer to FIG. 1 and FIG. 2, the touch control lead lines 300 having the second line section 320 crossing at least two touch control electrodes 200 is disposed on a side adjacent to the center of the display panel 100.

The closer between the center of the display panel 100 and the touch control lead lines 300, the more convenient for the touch control lead lines 300 to cross columns. In addition. A risk of short circuiting occurring on the touch control lead lines 300 away from the center of the display panel 100 are is reduced, and larger space for fan-out and layout is provided. As such, the touch control lead lines 300 can converge in the display area A, which is beneficial for fan-out. Touch control performance can be ensured and a width of a lower border can be reduced, which improves a display effect.

In some embodiments, please refer to FIG. 5 and FIG. 6, the second line section 320 of part of the touch control lead lines 300 directly extends from the display area A to the non-display area B.

The touch control lead lines 300 having the second line section 320 can be directly fanned-out to the non-display area B, and do not need to by fanned-out by the third line section 330, thereby reducing electric resistance of the touch control lead lines 300 and improving touch control performance. Since the third line section 330 is not necessary to be provided, larger space for fan-out and layout can be provided. As such, the touch control lead lines 300 can converge in the display area A, which is beneficial for fan-out. Touch control performance can be ensured, and a width of a lower border can be reduced, which improves a display effect.

In some embodiments, the display panel 100 further includes a bending area and a terminal area which are connected to a side of the non-display area B away from the display area A. The line-changing lead lines 480 are bonded to the bending area and a terminal disposed in the terminal area. In addition, the terminal is disposed on a backplate of the display panel 100 and is electrically connected to the driving control circuit. The present disclosure does not focus on bending and bonding, so the bending area and a bonding area are not shown.

In the present disclosure, a plurality of touch control lead lines and a plurality of touch control electrodes are disposed on different layers. In at least part of the touch control lead lines, a first line section of the touch control lead lines overlaps the touch control electrodes of corresponding touch control electrode columns, and a second line section at least overlaps the touch control electrodes, which are closest to the non-display area, of the corresponding touch control electrode columns. Therefore, space required for fan-out and layout of the touch control lead lines is enlarged, and the touch control lead lines can converge in a display area, which is beneficial for fan-out. As such, touch control performance can be ensured, and a width of a lower border can be reduced, so a display effect is improved.

Figure 11:
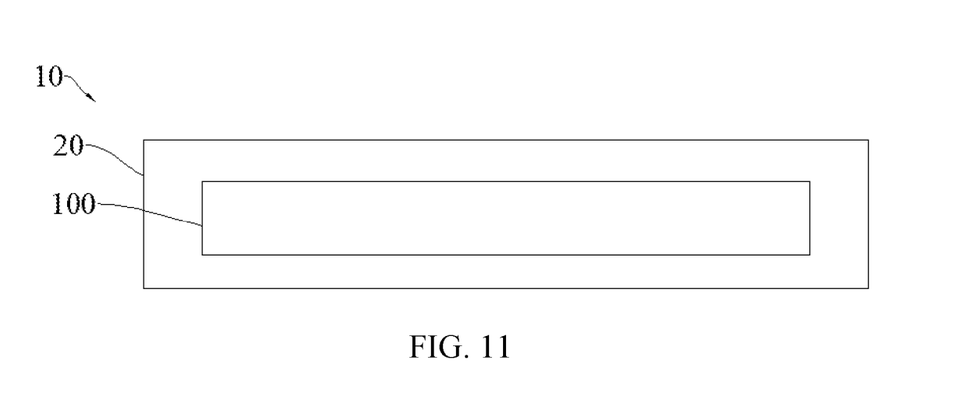
FIG. 11 is a structural schematic view showing a mobile terminal provided by an embodiment of the present disclosure.

Please refer to FIG. 11, an embodiment of the present disclosure further provides a mobile terminal 10, including any one of the above display panels 100 and a main terminal body 20. The main terminal body 20 and the display panel 100 are integrated with each other.

A specific structure of the display panel 100 can be referred to the display panel 100 of the above embodiments and drawings, and is not described here again.

In the present embodiment, the main terminal body 20 may include a middle frame, a frame sealant, and so on. The mobile terminal 10 can be a mobile display terminal such as a cellphone or a tablet, which is not limited here.

An embodiment of the present disclosure provides a display panel. The display panel includes a display area and a non-display area. The display panel includes a plurality of touch control electrodes spaced apart from each other and a plurality of touch control lead lines overlapping the touch control electrodes. Each of the touch control electrodes is electrically connected to the corresponding touch control lead lines. The touch control electrodes include a plurality of touch control electrode columns. At least part of the touch control electrode columns include a first line section and a second line section which extend along different directions. In at least part of the touch control lead lines, the first line section of the touch control lead lines overlaps the touch control electrodes of the corresponding touch control electrode columns, and the second line section at least overlaps the touch control electrodes, which are closest to the non-display area, of the corresponding touch control electrodes. In the present disclosure, by making the first line section of the touch control lead lines overlap the touch control electrodes of the corresponding touch control electrodes columns and making the second line section at least overlap the touch control electrodes, which are closest to the non-display area, of the corresponding touch control electrodes, space for fan-out and layout can be enlarged, and a width of a lower border can be reduced.

It should be noted that many changes and modifications to the described embodiments can be carried out by those skilled in the art, and all such changes and modifications are intended to be included within the scope of the appended claims.

What is claimed is:

1. A display panel, comprising a display area and a non-display area disposed on at least one side of the display area, wherein the display panel comprises:

a substrate;

a touch control layer disposed on a side of the substrate in the display area, wherein the touch control layer comprises a plurality of touch control electrodes spaced apart from each other; and a lead line layer disposed between the substrate and the touch control layer, wherein the lead line layer comprises a plurality of touch control lead lines overlapping the touch control electrodes and spaced apart from each other, and each of the touch control electrodes is electrically connected to the corresponding touch control lead lines;

wherein the touch control electrodes comprise a plurality of touch control electrode columns, at least part of the touch control lead lines comprise a first line section extending along a first direction and a second line section extending along a second direction, and the first direction and the second direction are different; and wherein in the at least part of the touch control lead lines,
the first line section of the touch control lead lines overlaps the touch control electrodes of corresponding touch control electrode columns,
the second line section at least overlaps the touch control electrodes, which are closest to the non-display area, of the corresponding touch control electrode columns, and
for each of the at least part of the touch control lead lines, the first line section of the touch control lead line does not cross the second line sections of other touch control lead lines of the at least part of the touch control lead lines, and the second line section of the touch control lead line does not cross the first line sections of the other touch control lead lines.

2. The display panel of claim 1, wherein the display panel comprises a virtual central axis extending along the first direction; and
the second line section of the touch control lead lines disposed at two sides of the virtual central axis extends toward the virtual central axis.

3. The display panel of claim 2, wherein in at least part of the touch control lead lines, the first line section of the touch control lead line overlaps the touch control electrodes of the touch control electrode corresponding to the first line section, and the second line section at least overlaps the touch control electrodes, which are closest to the non-display area, of at least two adjacent touch control electrode columns.

4. The display panel of claim 2, wherein the touch control lead lines comprise a touch control lead line group corresponding to the touch control electrode columns, and the touch control lead lines of the touch control lead line group are electrically connected to the touch control electrodes of the corresponding touch control electrode columns; and
in the touch control lead line group, at least part of the touch control lead lines comprise the first line section and the second line section corresponding to each other, and the touch control lead lines having the second line section are disposed on a side of the touch control lead lines not having the second line section away from the virtual central axis.

5. The display panel of claim 4, wherein in the touch control lead line group, each of the touch control lead lines comprises the first line section and the second line section corresponding to each other.

6. The display panel of claim 1, wherein the first line section of the touch control lead lines overlaps all of the touch control electrodes of the corresponding touch control electrode column, and the second line section at least overlaps the touch control electrodes, which are closest to the non-display area, of the corresponding touch control electrode columns.

7. The display panel of claim 1, wherein the touch control lead lines having the second line section comprises a third line section connected to an end of the second line section away from the first line section, the third line section is parallel to the first line section, and the third line section extends from the display area to the non-display area.

8. The display panel of claim 7, wherein in a top view of the display panel, between two adjacent touch control lead lines having the second line section, a distance between two adjacent second line sections is less than or equal to a distance between two adjacent first line sections, and a distance between two adjacent third line sections is less than or equal to the distance between two adjacent first line sections.

9. The display panel of claim 7, wherein the touch control layer comprises a line-changing section connected to an end of the third line section away from the second line section, and the line-changing section is disposed in the non-display area;
the display panel comprises a driving circuit layer disposed on a side of the lead line layer away from the touch control layer and a first insulating layer disposed between the driving circuit layer and the lead line layer, and the first insulating layer comprises a plurality of first through-holes; and
the line-changing section is electrically connected to the driving circuit layer by the first through-holes.

10. The display panel of claim 1, wherein in part of the touch control lead lines, the second line section directly extends from the display area to the non-display area.

11. A mobile terminal, comprising a display panel and a main terminal body, wherein the main terminal body is integrated with the display panel;
wherein the display panel comprises a display area and a non-display area disposed on at least one side of the display area;
the display panel comprises:
a substrate;
a touch control layer disposed on a side of the substrate in the display area, wherein the touch control layer comprises a plurality of touch control electrodes spaced apart from each other; and
a lead line layer disposed between the substrate and the touch control layer, wherein the lead line layer comprises a plurality of touch control lead lines overlapping the touch control electrodes and spaced apart from each other, and each of the touch control electrodes is electrically connected to corresponding touch control lead lines;
wherein the touch control electrodes comprise a plurality of touch control electrode columns, at least part of the touch control lead lines comprise a first line section extending along a first direction and a second line section extending along a second direction, and the first direction and the second direction are different; and
wherein in the at least part of the touch control lead lines,
the first line section of the touch control lead lines overlaps the touch control electrodes of corresponding touch control electrode columns,
the second line section at least overlaps the touch control electrodes, which are closest to the non-display area, of the corresponding touch control electrode columns, and for each of the at least part of the touch control lead lines, the first line section of the touch control lead line does not cross the second line sections of other touch control lead lines of the at least part of the touch control lead lines, and the second line section of the touch control lead line does not cross the first line sections of the other touch control lead lines.

12. The mobile terminal of claim 11, wherein the display panel comprises a virtual central axis extending along the first direction; and the second line section of the touch control lead lines disposed at two sides of the virtual central axis extends toward the virtual central axis.

13. The mobile terminal of claim 12, wherein in at least part of the touch control lead lines, the first line section of the touch control lead line overlaps the touch control electrodes of the touch control electrode corresponding to the first line section, and the second line section at least overlaps the touch control electrodes, which are closest to the non-display area, of at least two adjacent touch control electrode columns.

14. The mobile terminal of claim 12, wherein the touch control lead lines comprise a touch control lead line group corresponding to the touch control electrode columns, and the touch control lead lines of the touch control lead line group are electrically connected to the touch control electrodes of the corresponding touch control electrode columns; and in the touch control lead line group, at least part of the touch control lead lines comprise the first line section and the second line section corresponding to each other, and the touch control lead lines having the second line section are disposed on a side of the touch control lead lines not having the second line section away from the virtual central axis.

15. The mobile terminal of claim 14, wherein in the touch control lead line group, each of the touch control lead lines comprises the first line section and the second line section corresponding to each other.

16. The mobile terminal of claim 11, wherein the first line section of the touch control lead lines overlaps all of the touch control electrodes of the corresponding touch control electrode column, and the second line section at least overlaps the touch control electrodes, which are closest to the non-display area, of the corresponding touch control electrode columns.

17. The mobile terminal of claim 11, wherein the touch control lead lines having the second line section comprises a third line section connected to an end of the second line section away from the first line section, the third line section is parallel to the first line section, and the third line section extends from the display area to the non-display area.

18. The mobile terminal of claim 17, wherein in a top view of the display panel, between two adjacent touch control lead lines having the second line section, a distance between two adjacent second line sections is less than or equal to a distance between two adjacent first line sections, and a distance between two adjacent third line sections is less than or equal to the distance between two adjacent first line sections.

19. The mobile terminal of claim 17, wherein the touch control layer comprises a line-changing section connected to an end of the third line section away from the second line section, and the line-changing section is disposed in the non-display area;

the display panel comprises a driving circuit layer disposed on a side of the lead line layer away from the touch control layer and a first insulating layer disposed between the driving circuit layer and the lead line layer, and the first insulating layer comprises a plurality of first through-holes; and the line-changing section is electrically connected to the driving circuit layer by the first through-holes.

20. The mobile terminal of claim 11, wherein in part of the touch control lead lines, the second line section directly extends from the display area to the non-display area.

\* \* \* \* \*